(12) United States Patent
Wang et al.

(10) Patent No.: US 9,458,811 B2
(45) Date of Patent: Oct. 4, 2016

(54) HYBRID VEHICLE ENGINE START

(71) Applicant: Ford Global Technologies, LLC, Dearborn, MI (US)

(72) Inventors: Xiaoyong Wang, Novi, MI (US); Wei Liang, Farmington Hills, MI (US); Rajit Johri, Ann Arbor, MI (US); Mark Steven Yamazaki, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/057,060

(22) Filed: Oct. 18, 2013

(65) Prior Publication Data

US 2015/0112523 A1 Apr. 23, 2015

(51) Int. Cl.
| | | |
|---|---|---|
| *B60L 9/00* | (2006.01) | |
| *F02N 11/08* | (2006.01) | |
| *B60W 20/00* | (2016.01) | |

(Continued)

(52) U.S. Cl.
CPC .......... *F02N 11/0803* (2013.01); *B60W 10/02* (2013.01); *B60W 10/023* (2013.01); *B60W 10/06* (2013.01); *B60W 10/08* (2013.01); *B60W 20/40* (2013.01); *F02D 41/022* (2013.01); *F02D 41/062* (2013.01); *F02N 11/04* (2013.01); *F02N 11/0822* (2013.01); *F02N 11/103* (2013.01); *F02N 15/022* (2013.01); *F16H 61/143* (2013.01); *F02D 41/30* (2013.01); *F02D 2400/12* (2013.01); *F02N 2200/022* (2013.01); *F02N 2200/023* (2013.01); *F02N 2200/041* (2013.01); *F02N 2200/101* (2013.01); *F02P 5/1506* (2013.01); *Y02T 10/48* (2013.01); *Y02T 10/6286* (2013.01); *Y10S 903/902* (2013.01)

(58) Field of Classification Search
CPC .... B60W 20/00; B60W 10/08; B60W 10/06; B60W 2510/244; B60W 10/26; B60W 10/02; B60W 10/023; B60W 20/40; F02N 11/0803; F02N 11/04; F02N 11/0822; F02N 11/103; F02N 15/022; F02N 41/30; F02N 2200/022; F02N 2200/023; F02N 2200/041; F02N 2200/101; F02D 41/022; F02D 41/062; F02D 41/30; F02D 2400/12; F16H 61/143; F02P 5/1506; Y02T 10/48; Y02T 10/6286; Y10S 903/902
USPC ...................... 701/22; 180/65.265; 290/38 C
See application file for complete search history.

(56) References Cited

U.S. PATENT DOCUMENTS

| | | | |
|---|---|---|---|
| 6,581,705 B2 | 6/2003 | Phillips et al. | |
| 6,868,949 B2 | 3/2005 | Braford, Jr. | |

(Continued)

*Primary Examiner* — Shardul Patel
(74) *Attorney, Agent, or Firm* — David B. Kelley; Brooks Kushman P.C.

(57) ABSTRACT

A vehicle includes an engine having a crankshaft, a transmission having an input, and an electric machine mechanically coupled to the transmission input. The vehicle further includes a clutch configured to mechanically couple the electric machine and engine crankshaft, and at least one controller. The at least one controller, in response to an engine start condition and subsequent partial engagement of the clutch, outputs a torque command for the electric machine to increase the speed of the crankshaft to a speed of the electric machine before commanding fuel injection of the engine. The torque command is based on driver demanded torque and a change in speed of the crankshaft caused by changes in pressure to the clutch.

10 Claims, 4 Drawing Sheets

(51) Int. Cl.
  *B60W 10/02* (2006.01)
  *B60W 10/06* (2006.01)
  *B60W 10/08* (2006.01)
  *F02D 41/02* (2006.01)
  *F02D 41/06* (2006.01)
  *F02N 11/04* (2006.01)
  *F02N 11/10* (2006.01)
  *F02N 15/02* (2006.01)
  *F16H 61/14* (2006.01)
  *F02D 41/30* (2006.01)
  *F02P 5/15* (2006.01)

(56) References Cited

U.S. PATENT DOCUMENTS

| | | | |
|---|---|---|---|
| 8,297,249 B2 | 10/2012 | Seufert et al. | |
| 8,299,639 B2 | 10/2012 | Usami et al. | |
| 2003/0229429 A1* | 12/2003 | Zhang | B60K 6/48 701/22 |
| 2004/0045750 A1* | 3/2004 | Baraszu | B60K 6/48 180/65.25 |
| 2006/0089232 A1* | 4/2006 | Kobayashi | B60K 6/48 477/70 |
| 2007/0056784 A1* | 3/2007 | Joe | B60K 6/48 180/65.245 |
| 2007/0080005 A1* | 4/2007 | Joe | B60K 6/48 180/65.245 |
| 2008/0119975 A1* | 5/2008 | Yamazaki | B60K 6/48 701/22 |
| 2010/0093477 A1* | 4/2010 | Foster | B60K 6/365 475/116 |
| 2011/0004364 A1* | 1/2011 | Sawada | B60K 6/445 701/22 |
| 2011/0165992 A1* | 7/2011 | Ueno | B60K 6/365 477/9 |
| 2012/0029745 A1* | 2/2012 | Miyao | B60K 6/105 701/22 |
| 2012/0270697 A1* | 10/2012 | Takami | B60K 6/387 477/5 |
| 2013/0297132 A1* | 11/2013 | Yaguchi | B60K 6/445 701/22 |
| 2014/0010668 A1* | 1/2014 | Sah | F16H 61/0021 417/44.1 |
| 2014/0012450 A1* | 1/2014 | Laing | B60L 11/14 701/22 |
| 2014/0024495 A1* | 1/2014 | Kim | B60K 6/52 477/167 |
| 2014/0136039 A1* | 5/2014 | Tanishima | B60K 6/48 701/22 |

* cited by examiner

HYBRID VEHICLE ENGINE START

TECHNICAL FIELD

This disclosure relates to systems and methods for controlling an engine start in a hybrid vehicle.

BACKGROUND

A hybrid electric vehicle (HEV) utilizes a combination of an internal combustion engine with an electric motor to provide the power needed to propel the vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or if the battery state of charge (SOC) drops below a certain level, the engine must start quickly and smoothly in a manner that is nearly transparent to the driver.

Starting an engine in an HEV can occur when the vehicle is operating under any number of different conditions. Control of the engine start under various vehicle operating conditions may be different based on a number of vehicle component factors. The strategy to start an engine in a HEV may cause the powertrain system to start rough, start sluggishly, cause additional noise and vibration to the powertrain, and/or cause hardware damage to components engaging the engine to start at certain powertrain speeds. In addition, starting the engine in an HEV when it is moving under the power of the electric motor may cause a noticeable, and therefore undesirable, torque disturbance in the vehicle driveline.

SUMMARY

A vehicle includes an engine having a crankshaft, a transmission having an input, and an electric machine mechanically coupled to the transmission input. The vehicle further includes a clutch configured to mechanically couple the electric machine and engine crankshaft, and at least one controller. The at least one controller is programmed to output a torque command for the electric machine in response to an engine start condition and subsequent partial engagement of the clutch. The controller may calculate the torque command for the electric machine to increase the speed of the crankshaft based on driver demanded torque and a change in speed of the crankshaft caused by changes in pressure to the clutch. The controller may increase the speed of the crankshaft to a speed of the transmission input before allowing fuel injection and spark of the engine.

A vehicle includes an engine having a crankshaft, a transmission having an input, an electric machine mechanically coupled to the transmission input, and a clutch configured to mechanically couple the electric machine and the engine crankshaft. The vehicle also includes at least one controller programmed to output a torque command for the electric machine in response to an engine start condition and subsequent partial engagement of the clutch. The output torque command for the electric machine may be based on a driver demanded torque, engine temperature, speed of the crankshaft, and a change in speed of the crankshaft caused by changes in pressure to the clutch. The changes in pressure to the clutch may increase the speed of the crankshaft to a speed of the transmission input before fuel injection of the engine is commanded by the controller. The controller may lock the clutch in response to the speed of the crankshaft being approximately equal to the speed of the transmission input.

An engine starting method is enabled in response to an engine starting condition and partial engagement of a clutch configured to mechanically couple the engine and an electric machine. The engine start method may output a torque command for the electric machine based on a driver demanded torque and changes in speed of the engine. The method controls the changes in speed of the engine by commanding changes in pressure to the clutch. The method may allow the changes in pressure to the clutch to increase the speed of the engine to a speed of the electric machine before commanding fuel injection of the engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
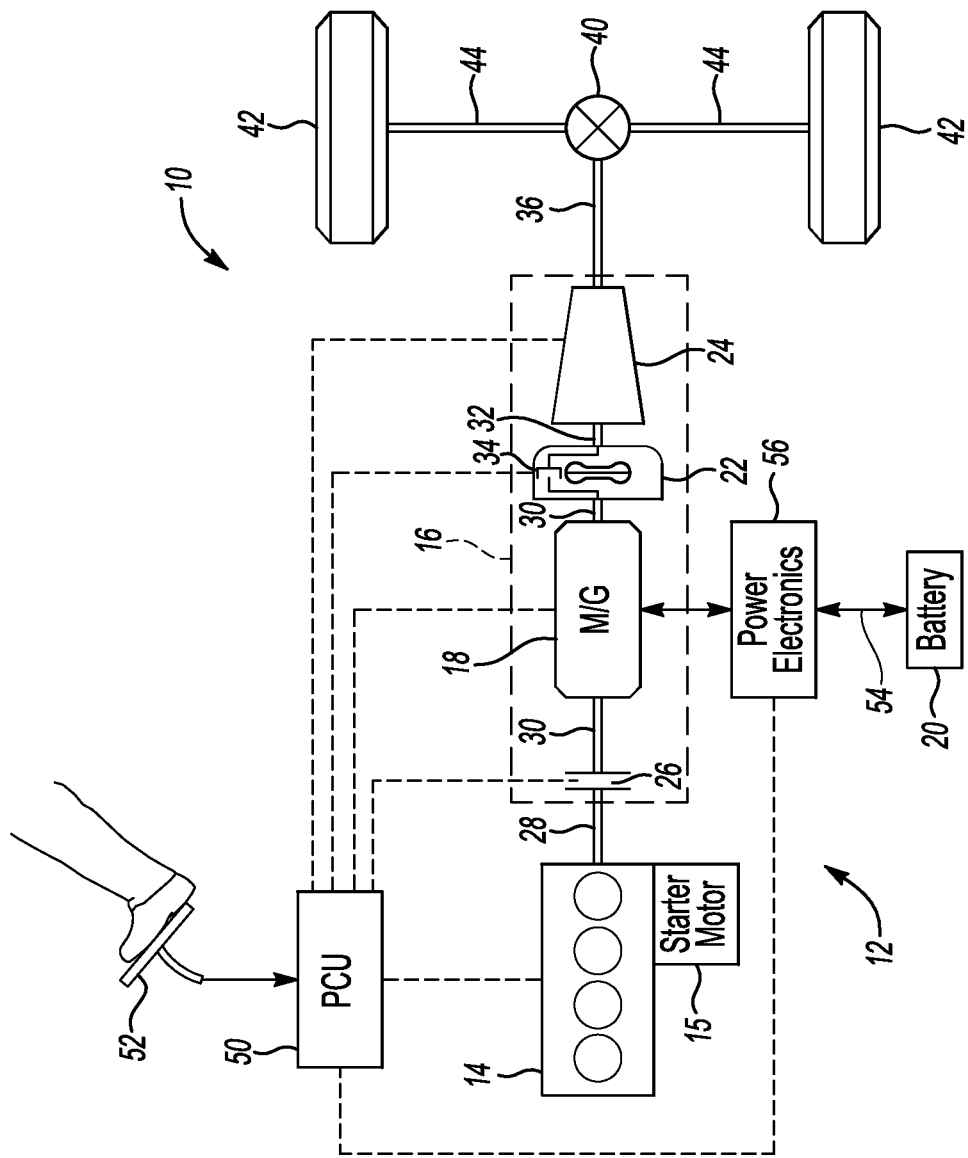
FIG. 1 is a schematic diagram of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The engine may be started using several methods including, but not limited to, a starter motor 15 that engages the flywheel to rotate the engine for starting. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by an engine crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 48. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for a disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
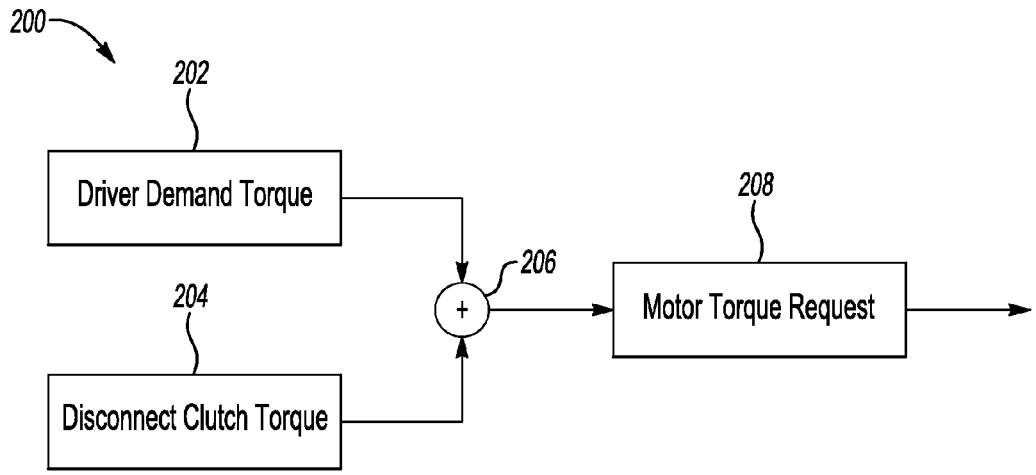
FIG. 2 is an example of an open loop control method for torque commanded to an electric motor in a hybrid electric vehicle.

FIG. 2 is an example of an open loop control method for torque commanded to an electric motor in a hybrid electric vehicle. A hybrid vehicle may have one or more control modules in communication with each other to calculate and transmit torque requests to the powertrain system (e.g. electric motor, engine, etc.). The torque being requested to the powertrain system includes, but is not limited to, diver demanded torque, vehicle systems requesting power/torque, and the amount of torque needed to engage the disconnect clutch to start the engine. The system may have several sensors, algorithms, and/or hardware components used to determine control of the electric motor and/or engine in a hybrid electric vehicle.

There may be several strategies used to control the start of a hybrid electric vehicle engine while maintaining a smooth vehicle response to driver demand. In one embodiment, the hybrid electric vehicle engine start strategy includes the use of the electric motor while simultaneously closing a clutch that connects the engine to the electric motor. For example, a closed loop engine start strategy may include starting the engine based on driver demand and connecting the disconnect clutch to the powertrain while fueling the engine and predicting a desired electric motor speed. The closed loop engine start strategy may continually calculate a desired motor torque by a feedback signal reading actual powertrain speed.

In another example, an open loop engine start strategy for a hybrid electric vehicle may receive driver demanded torque and the disconnect clutch torque from one or more control modules. The system may allow the motor torque to be requested based off the received powertrain torque values being requested by one or more vehicle computing system inputs.

At step 202, the system may receive driver demand torque from several inputs including, but not limited to, accelerator pedal inputs, cruise control inputs, and/or other system inputs that may request torque based on component need and/or driver demand. The driver demanded torque may be based on several calibratable tables associated with torque capabilities of the electric motor. The vehicle system may also have one or more calibratable tables associated with driver demanded torque and the available torque of the system with the engine turned on and/or off.

At step 204, once it has determined that an engine start is being requested, the hybrid powertrain system may determine a disconnect clutch torque to be transmitted to the motor torque request. The disconnect clutch torque may be calculated using one or more calibratable tables that take into account several vehicle factors including, but not limited to, vehicle speed, motor speed, barometric pressure, and/or characteristics of the clutch design.

At step 206, the system may receive the driver demanded torque and disconnect clutch torque, and apply those respective values to get a motor torque request for the electric motor(s). The motor torque request may take into consideration the disconnect clutch torque to allow for the additional torque needed to start the engine, otherwise the input torque to the transmission may deviate from the driver's demand in the form of a torque hole or torque surge. The torque hole and/or torque surge may degrade the demanded torque response of the powertrain system and/or cause additional driveline noise and vibration. The motor torque request may be determined and transmitted to the electric motor at step 208.

Figure 3:
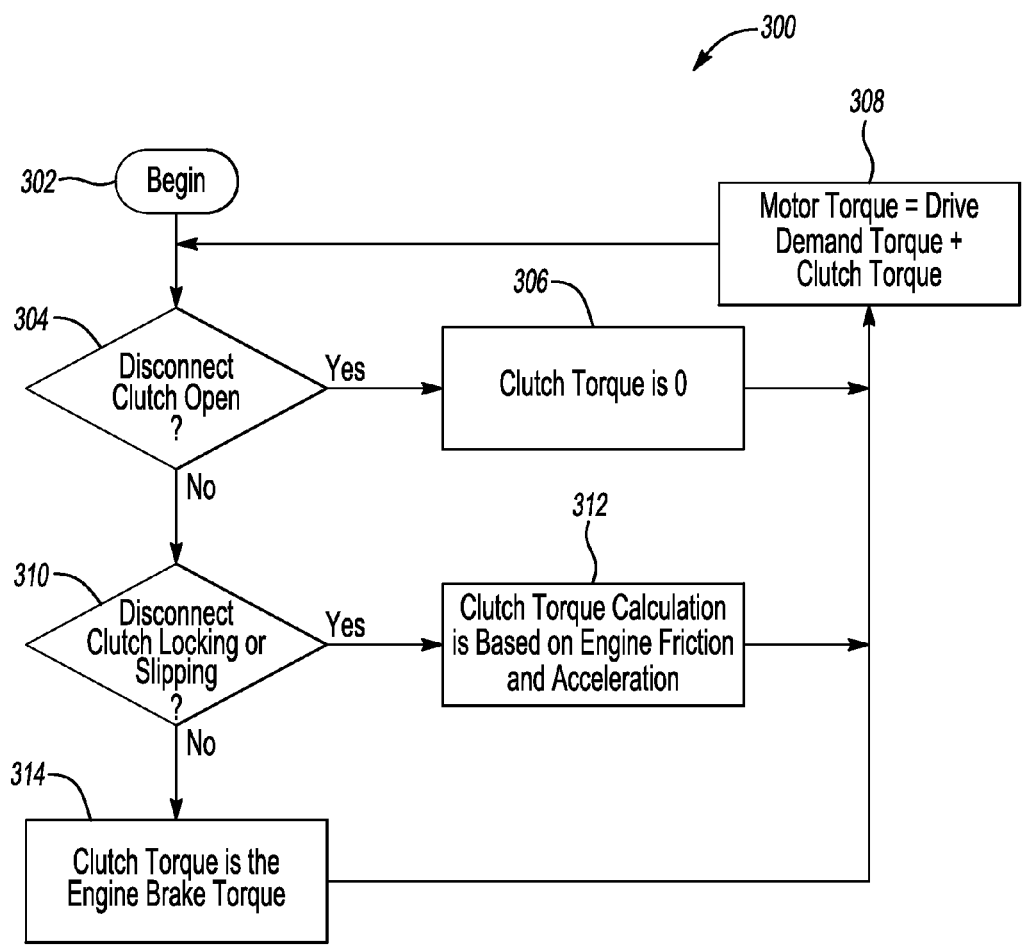
FIG. 3 is a flow chart illustrating an example algorithm for estimating torque through the disconnect clutch in a hybrid electric vehicle.

FIG. 3 is a flow chart illustrating an example algorithm for determining the clutch state and estimating the torque going through the disconnect clutch in a hybrid electric vehicle. An accurate estimation of the torque going through the disconnect clutch may allow for commanding a precise torque request to the transmission when an engine start is requested. A precise torque request to the transmission when an engine start is requested allows for an improved driver demanded torque response of the powertrain system while reducing driveline noise and vibration, and providing for a simpler engine start design to implement in a hybrid electric vehicle powertrain system.

At step 302, the hybrid powertrain system may enter a torque estimation strategy to determine an estimated torque going through the disconnect clutch. The torque estimation strategy may depend on the disconnect clutch state and whether the vehicle is in electronic vehicle mode (clutch open), hybrid mode (engine on with clutch locked), and/or is starting an engine (clutch slipping). The system may take into consideration several factors when trying to determine the estimated torque of the disconnect clutch including, but not limited to, the commanded clutch pressure that may be different from the actual clutch pressure, the stroke pressure and clutch plate friction coefficient, which are subject to change during operating conditions, and/or the clutch slipping direction.

At step 304, the system may receive one or more signals to establish if the disconnect clutch is open. If the disconnect clutch is open, then the system may determine that the clutch torque is at zero at step 306. For example, when the hybrid electric vehicle is in electric mode, the disconnect clutch is at zero torque and the motor supplies all the power from the powertrain system to the wheels.

At step 310, the system may determine if the clutch is locking or slipping if the disconnect clutch is not open. If the disconnect clutch is slipping or locking, the system may establish clutch torque based on a calculation including engine cranking torque (e.g. engine friction/resistance) and acceleration at step 312. The engine cranking torque calculation of the disconnect clutch slipping/locking state takes into account engine resistance including, but not limited to, initial engine crankshaft position, engine coolant temperature, barometric pressure, engine speed, pumping losses, one or more pistons moving inside a cylinder, and/or front end accessory loads of the engine. Based on the engine resistance variables, the system may determine the engine cranking torque. The acceleration factor for the clutch torque calculation of the disconnect clutch slipping/locking state takes into account engine speed versus time. During the clutch torque calculation process, the engine is not scheduled for fuel injection and spark activation. Therefore engine combustion will not initiate. Without the engine combustion torque, which is difficult to estimate, the clutch torque estimation using the engine cranking torque and engine acceleration is accurate and robust.

At step 314, the system may determine that the disconnect clutch is locked; therefore the clutch torque is the engine brake torque value. The disconnect clutch being locked to the engine may take place when the hybrid electric vehicle is in a hybrid mode by having the engine and motor supply power to the powertrain system. The motor torque value may be calculated by adding driver demanded torque to the clutch torque value at step 308. The system may transmit the determined motor torque value to the motor.

Figure 4:
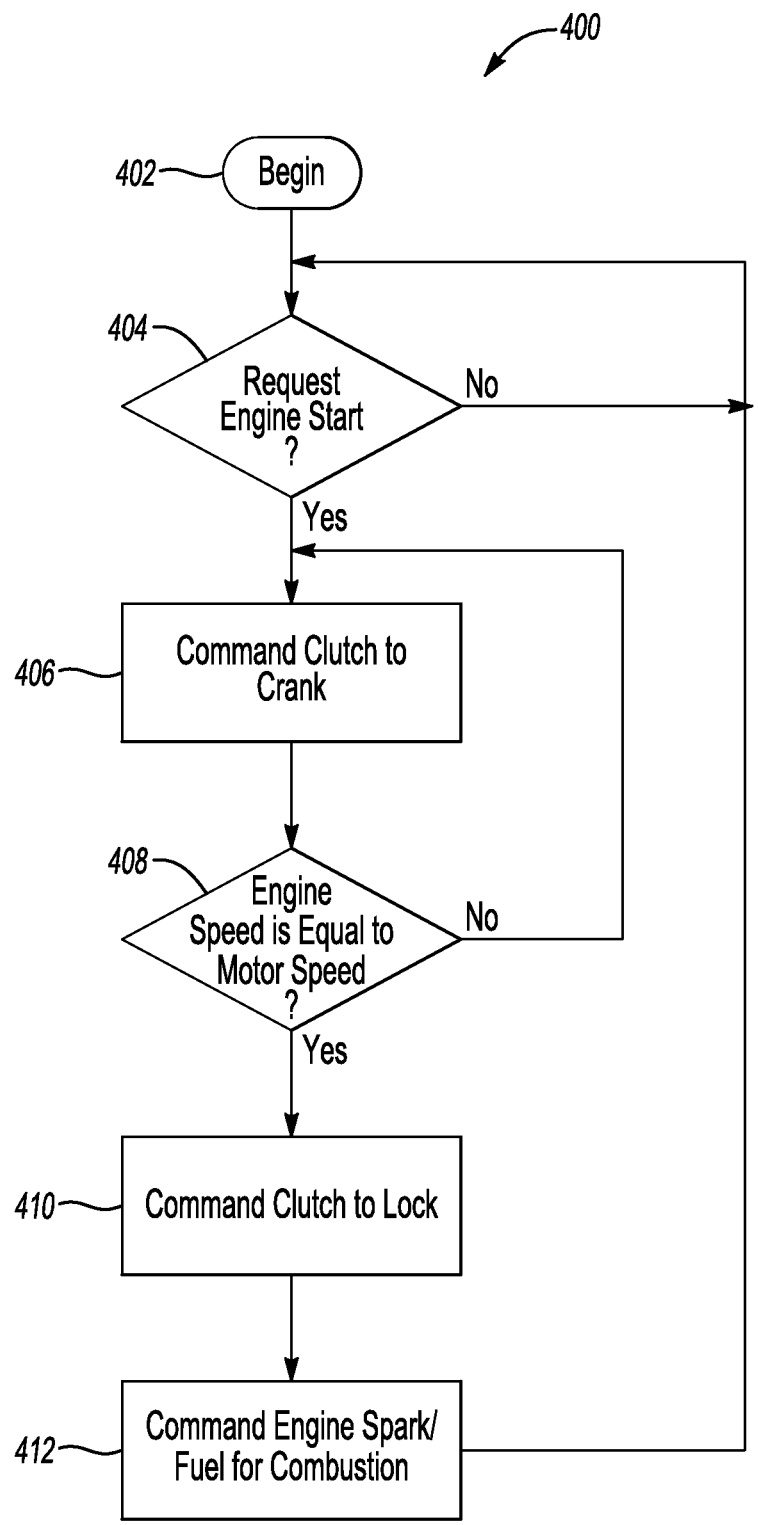
FIG. 4 is a flow chart illustrating an example algorithm for commanding engine start using the disconnect clutch.

FIG. 4 is a flow chart illustrating an example algorithm for commanding engine start 400 using the disconnect clutch in a hybrid electric vehicle. The method is implemented using software code contained within the vehicle control module, according to one or more embodiments. In other embodiments, the method 400 is implemented in other vehicle controllers, or distributed amongst multiple vehicle controllers.

Referring again to FIG. 4, the vehicle and its components illustrated in FIG. 1 are referenced throughout the discussion of the method to facilitate understanding of various aspects of the present disclosure. The method of controlling the start of an engine in the hybrid electric vehicle may be implemented through a computer algorithm, machine executable code, or software instructions programmed into a suitable programmable logic device(s) of the vehicle, such as the vehicle control module, the hybrid control module, other controller in communication with vehicle computing system, or a combination thereof. Although the various steps shown in the flowchart diagram 400 appear to occur in a chronological sequence, at least some of the steps may occur in a different order, and some steps may be performed concurrently or not at all.

The hybrid electric vehicle powertrain configuration (e.g. modular hybrid transmission) allows the engine to connect to the driveline with the use of a disconnect clutch. The flow chart discloses a method to start the engine in a hybrid powertrain system using a disconnect clutch and electric motor while maintaining a smooth vehicle response to driver demand. The engine start method using the electric motor while simultaneously closing the disconnect clutch to connect the engine requires an algorithm to estimate engine cranking torque and acceleration. It is noteworthy at the outset of entering or performing the engine start strategy method that the system may be configured to terminate at any point of the strategy if a vehicle brake is applied or some other input changes value (not shown).

At 402, the engine start strategy begins with a command from the vehicle system controller to enter an engine start mode. The one or more control modules communicating with the hybrid powertrain system may receive the request to start the engine at step 404. If the engine start is not requested, or the request is aborted, the system may continuously monitor for an engine start being made by one or more vehicle systems, subsystems, and/or components.

At 406, the system may enter the engine start mode and command the clutch to begin to spin/crank the engine. The system may continue to spin the engine with the disconnect clutch while monitoring if the engine speed is equal to the motor speed at step 408. If the engine speed is less than the motor speed, the system may continue to command the clutch to spin/crank the engine at step 406.

The disconnect clutch may continue to spin until the engine speed is equal to the motor speed allowing for a smooth engine start. The spin of the disconnect clutch to ramp up engine speed is allowed by letting the clutch slip. There is no combustion torque being calculated because spark and fuel are disabled during this state of spinning the engine, therefore the clutch torque is the only torque to spin the engine. Because of no engine combustion during the engine spin state, the engine speed is not going to overshoot the motor speed and thus the direction of the clutch torque is always from the motor to the engine. The system may disregard the need to detect torque direction for command of reverse direction of the clutch to control engine speed overshoot since the direction of the clutch torque is always from the motor to the engine.

For example, in cases in which the engine is allowed to combust before the clutch is locked, it is very likely that the engine speed overshoots the motor speed, which causes the clutch torque direction to change. However, the actual detection of the speed overshoot is difficult because of noise in the signals and other dynamic effects caused by engine combustion. The system may also take into consideration magnitude of the disconnect clutch by monitoring actual clutch pressure and understanding other clutch design characteristics including, but not limited to, estimating pressure from commanded pressure.

The system may receive disconnect clutch commanded pressure and/or measured pressure. The system may convert the clutch pressure into clutch torque and transmit the torque to the motor. The clutch pressure may be determined based on the clutch torque calculation using engine friction and acceleration (as mentioned above). The clutch pressure may also take into consideration the characteristics of the clutch design when determining the commanded pressure.

The clutch torque applied to the engine may be difficult to estimate if the engine is applying fuel and spark causing combustion during an engine start. The system may request that fuel and spark be excluded during the spinning of the clutch to allow for an improved clutch torque estimate without the noise from engine combustion.

At step 410, if the engine speed is equal to the motor speed, the system may command the disconnect clutch to lock to the engine. Once the disconnect clutch is locked to the engine, the system may command engine fuel and spark to initiate combustion at step 412.

Figure 5:
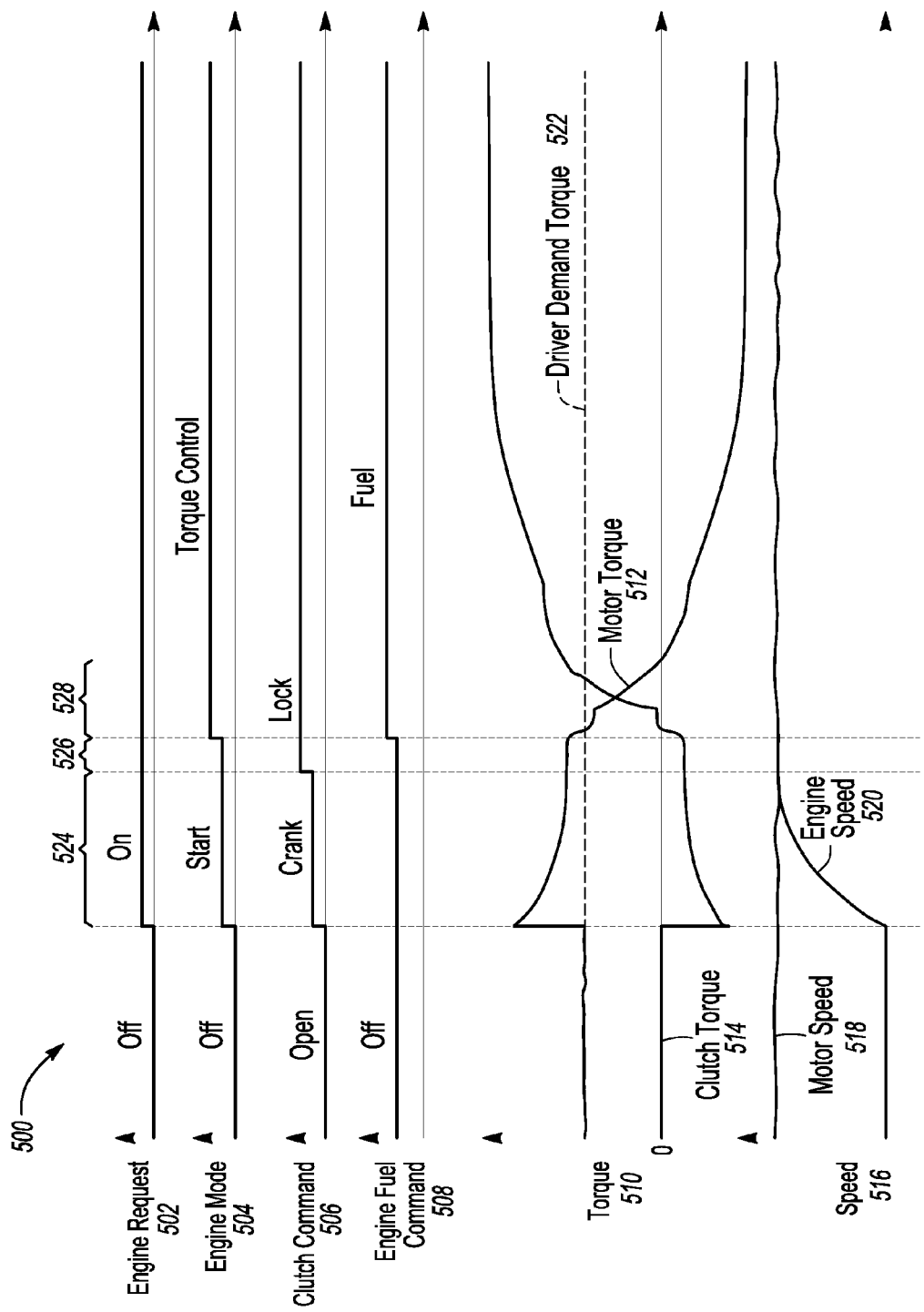
FIG. 5 is a graph illustrating the use of a clutch in a hybrid powertrain system to start the engine.

FIG. 5 is a graph illustrating the use of a clutch in a hybrid powertrain system to start the engine. The system may command the disconnect clutch to spin by requesting clutch torque based off the estimated torque from engine friction, pumping losses, and engine acceleration which are well established. The system may use the clutch pressure to command the torque of the disconnect clutch to allow slipping during cranking of the engine. As the engine is not producing combustion torque (since no fuel and spark are being demanded), the torque direction is always from the motor to the engine which avoids the determination of the torque direction using measured speeds. The system commands that engine combustion be delayed during the slipping of the clutch, as the combustion torque may be difficult to estimate accurately if combustion is allowed.

The vehicle computing system may have one or more controllers in communication with each other to transmit and receive vehicle system data during the operation of a hybrid powertrain system. The system may recognize an engine start request 502 as being off, therefore the engine mode 504 is disabled and the clutch command 506 is open. During an off engine state 502 the system may request no torque from the clutch 514, while the vehicle may be in electric mode having the motor torque 512 provide power to the powertrain system based off the driver demand torque 522.

The vehicle computing system may determine based on one or more factors that an engine start is being requested. The one or more factors may include, but is not limited to, battery state of charge, driver demanded torque, and/or one or more systems/subsystems requesting power from the engine. Once the engine request 502 to turn on is received by the hybrid powertrain system, the engine mode 504 may enter a starting sequence that includes the clutch command 506 to begin cranking.

The hybrid powertrain system may disable engine combustion during the engine cranking 524 by engine fuel command 508 being requested off. The one or more controllers may calculate the estimated clutch torque needed for cranking the engine while allowing the powertrain system to maintain the driver demanded torque 522. As shown on the graph, the motor torque 512 may increase to account for the estimated torque needed to drive the clutch 506 for cranking the engine during the start event 524. The graph illustrates the additional torque being generated by the motor torque 512 delivered to the clutch torque 514. During the engine start 524, the motor speed 518 may remain constant while the engine speed 520 is ramping up during the cranking event.

The system allows the clutch to slip during the cranking of the engine to allow for a smooth ramp of the engine speed 520. The system is allowed to calculate the torque of the clutch to allow for minimal overshoot of engine speed 520 because the engine fuel is commanded off reducing the amount of noise generated on the powertrain system.

The system continues to monitor the motor speed 518 and engine speed 520, and once the engine speed 520 equals motor speed 518, the system may command the clutch 506 to lock to the engine. The clutch locking event 526 is illustrated on the graph once the engine speed equals the motor speed. During the clutch locking event 526, the clutch torque 514 is still being calculated based on engine friction/ resistance, pumping loss, and/or accessory torque while the engine fuel command 508 is off.

The system may request that the engine fuel command 508 be turned on allowing the engine to begin combustion to provide power to the powertrain system. In the engine combustion phase 528, the system enables fuel and spark to the engine allowing the engine torque to ramp in and the clutch torque 514 to change direction now that the engine is producing power. As the engine begins to provide power to the powertrain system, the motor torque may decrease. The combination of motor torque and engine torque in the hybrid powertrain system may deliver the driver demanded torque 522 being requested and/or calculated by one or more vehicle control modules.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising: an engine including a crankshaft; a transmission having an input; an electric machine mechanically coupled to the input; a disconnect clutch configured to disconnect the electric machine from the crankshaft; and at least one controller programmed to, in response to an engine start condition and subsequent partial engagement of the disconnect clutch, output a torque command for the electric machine based on a driver demanded torque, a temperature of the engine, a speed of the crankshaft, and a change in speed of the crankshaft caused by changes in pressure to the disconnect clutch to increase the speed of the crankshaft to a speed of the input before the disconnect clutch is locked and fuel injection of the engine.

2. The vehicle of claim 1 wherein the at least one controller is further programmed to lock the disconnect clutch in response to the speed of the crankshaft being approximately equal to the speed of the input.

3. The vehicle of claim 2 wherein the at least one controller is further programmed to initiate the fuel injection of the engine after the disconnect clutch is locked.

4. The vehicle of claim 2 wherein the at least one controller is further programmed to initiate spark of the engine after the disconnect clutch is locked.

5. A vehicle comprising: an engine including a crankshaft; a transmission having an input; an electric machine mechanically coupled to the input; a disconnect clutch configured to mechanically couple the electric machine from the crankshaft; and at least one controller programmed to in response to an engine start condition and subsequent partial engagement of the disconnect clutch, output a torque command for the electric machine based on a driver demanded torque, a temperature associated with the engine, a speed of the crankshaft, and a change in speed of the crankshaft caused by changes in pressure to the disconnect clutch to increase the speed of the crankshaft to a speed of the input before the disconnect clutch is locked and fuel injection of the engine, and in response to the speed of the crankshaft being approximately equal to the speed of the input, lock the disconnect clutch.

6. The vehicle of claim 5 wherein the at least one controller is further programmed to initiate the fuel injection of the engine after the disconnect clutch is locked.

7. The vehicle of claim 5 wherein the at least one controller is further programmed to initiate spark of the engine after the disconnect clutch is locked.

8. A method comprising: in response to an engine start condition and partial engagement of a clutch configured to disconnect an engine from an electric machine, outputting an electric machine torque command based on driver demanded torque, engine temperature, engine speed, and engine speed changes caused by changes in pressure to the clutch to increase the engine speed to a speed of the electric machine before locking the clutch and commanding fuel injection of the engine.

9. The method of claim 8 further comprising locking the clutch in response to the ermine speed being approximately equal to a speed of a transmission input mechanically coupled to the electric machine.

10. The method of claim 9 further comprising initiating fuel injection of the engine after the clutch is locked.

* * * * *